Jan. 12, 1932.　　　P. J. LUCEY　　　1,840,845
FEEDING MECHANISM FOR SLICING MACHINES
Filed Nov. 27, 1928　　　3 Sheets-Sheet 1

WITNESS:

INVENTOR
Patrick J. Lucey
BY Augustus B. Stoughton,
ATTORNEY.

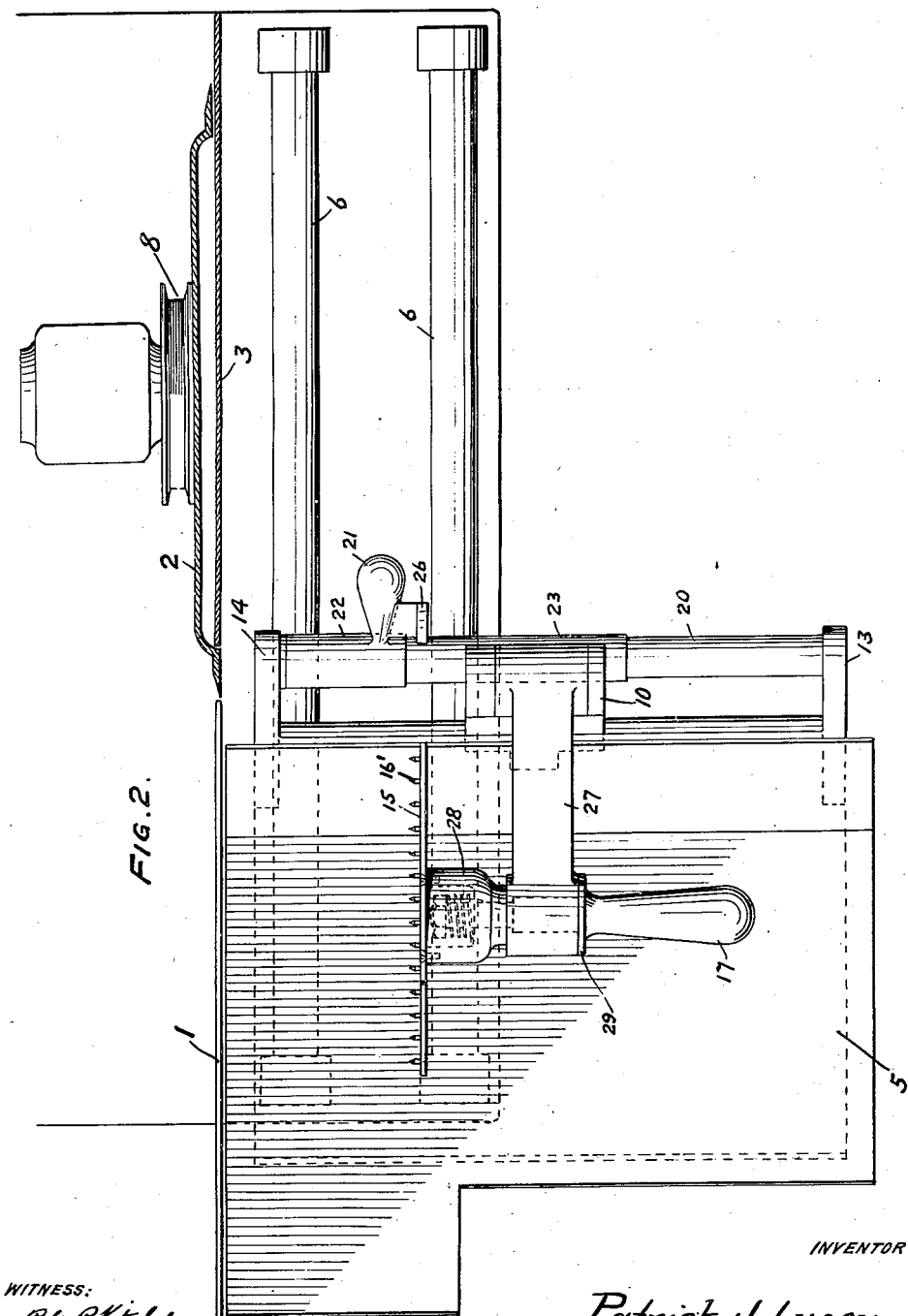

Jan. 12, 1932.  P. J. LUCEY  1,840,845
FEEDING MECHANISM FOR SLICING MACHINES
Filed Nov. 27, 1928   3 Sheets-Sheet 3
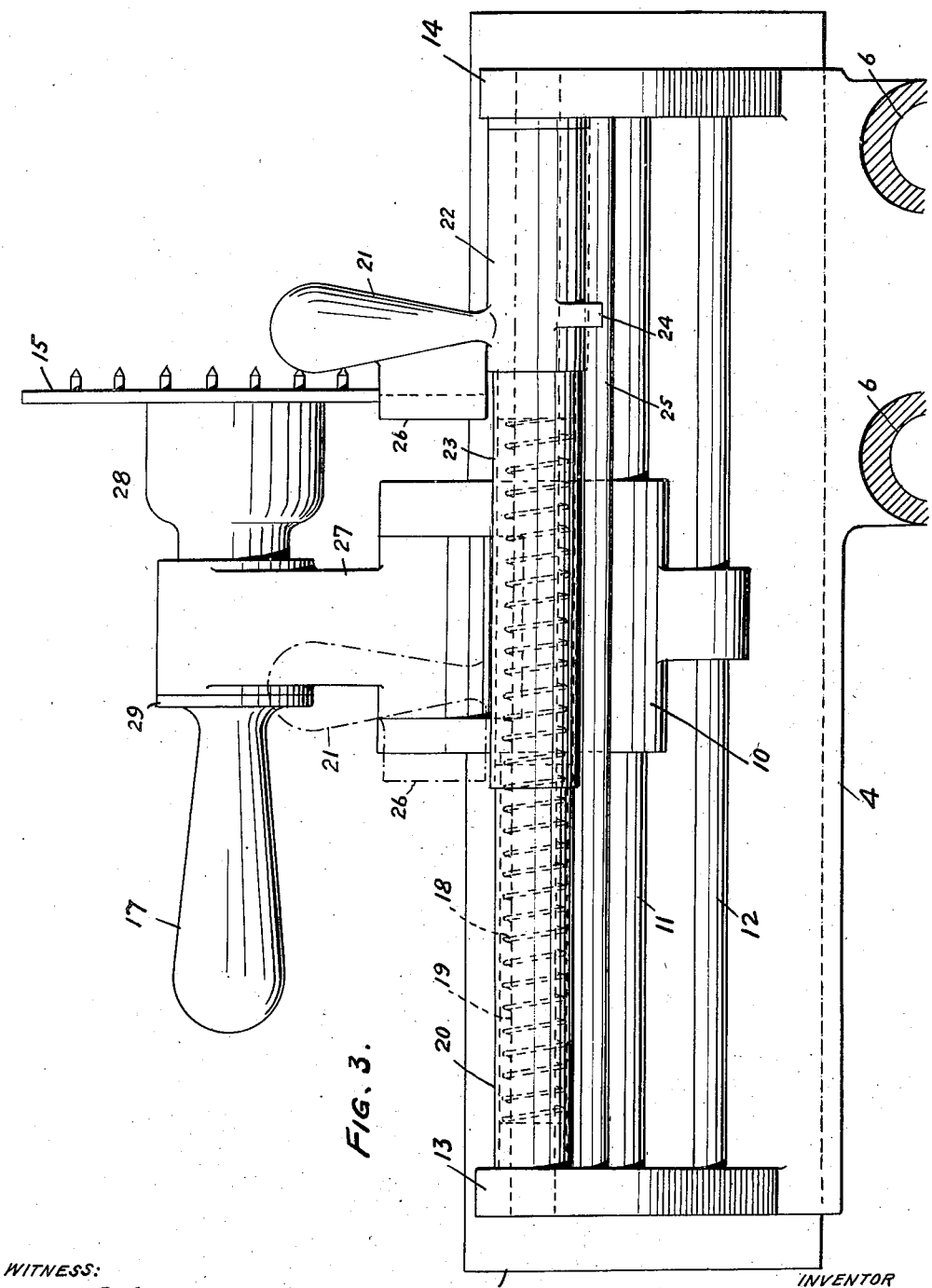

Patented Jan. 12, 1932

1,840,845

UNITED STATES PATENT OFFICE

PATRICK J. LUCEY, OF CHICAGO, ILLINOIS, ASSIGNOR, BY MESNE ASSIGNMENTS, TO AMERICAN SLICING MACHINE COMPANY, OF CHICAGO, ILLINOIS, A CORPORATION OF NEW YORK

FEEDING MECHANISM FOR SLICING MACHINES

Application filed November 27, 1928. Serial No. 322,207.

The present invention relates to feeding mechanism for slicing machines, and more particularly to machines in which there is provided a carriage or table having a meat tray and being arranged for reciprocation with respect to the gauge plate and to a rotary knife and its guard.

The main objects of this invention are: 1st—to provide a meat pusher adapted to operate on the end of the meat or other object; and, 2nd, to provide for moving the meat pusher with respect to the gauge plate manually throughout the whole or a portion of its stroke and for moving the pusher throughout a portion of its stroke by the pressure of a spring manually compressed.

This invention, generally stated, comprises feed mechanism for slicing machines, including in combination a gauge plate, a head slidable with respect to the plate, a meat pusher hinged to said head, a spring device effective toward the plate, and a coupling device for setting said spring device and for connecting and disconnecting the head and the spring device.

The above objects and other objects and advantages are attained with this invention, as will become apparent from the following description, taken in connection with the accompanying drawings, in which Fig. 1 is an elevational view looking toward the gauge plate;

Fig. 2 is a top plan view of Fig. 1, with parts in section, and

Fig. 3 is an enlarged sectional view, taken on line 3—3 of Fig. 1.

Figure 1:
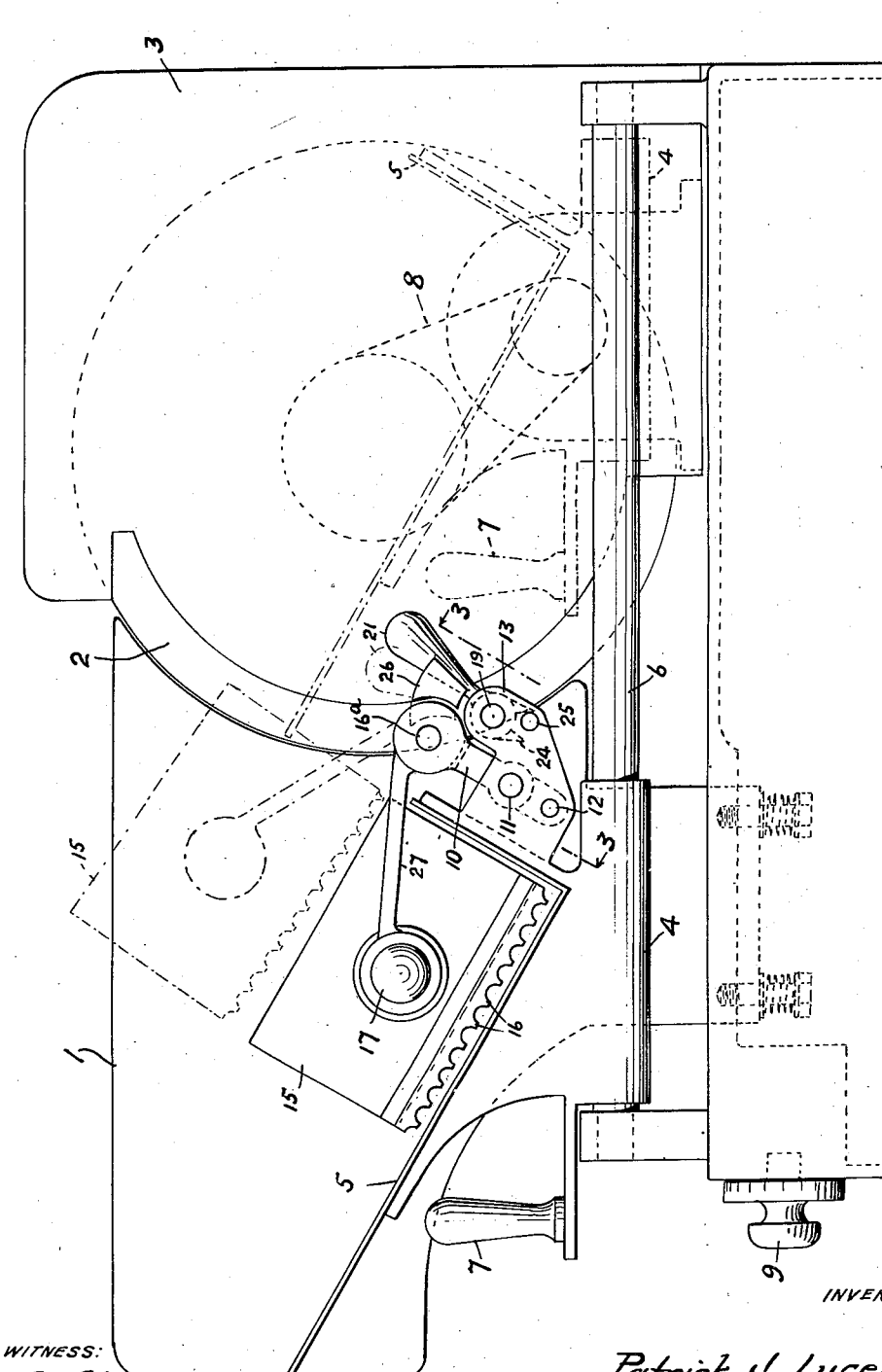

In the drawings I have illustrated my invention in connection with a slicing machine having a gauge plate 1, a rotary knife 2, and a guard 3 for the knife. There is a carriage or reciprocating table 4 having a meat tray 5 thereon, said carriage or table being slidable on slideways 6, shown as of the form of parallel cylindrical rods. This carriage is reciprocated by means of a handle 7, from the position shown by full lines, in Fig. 1, to the position shown therein by dotted lines. Means for rotating the knife is indicated at 8.

It will be understood that the gauge plate is properly set for the thickness of slice desired, and the handle or knob 9 is a part of means provided for that purpose, said means being not further shown nor fully described herein because the same forms no part of the present invention.

In general the above described members do not form a part of the present invention, except as the same cooperate therewith.

The carriage or table 4 is provided with a head 10 arranged to slide on rods 11 and 12 which are mounted in brackets or supports 13 and 14 provided on the carriage. The head 10 is movable on said rods toward and away from the gauge plate 1, and this head moves with the carriage 4 in its reciprocation on the rod 6.

A meat pusher 15 is provided which is hinged at 16ª to the head 10. The lower edge of the meat pusher is preferably provided with teeth or spurs 16, Fig. 1, and its face which confronts the gauge plate is provided with pins or spurs 16', Fig. 2. This meat pusher also includes a handle 17.

The meat pusher, in the position shown by full lines in Fig. 1, may be placed behind the object to be sliced and may be used manually to push the object toward the gauge plates. In the position shown by dotted lines in Fig. 1, said pusher may be caused to engage with its spurs 16 at the top of the object to be sliced and in that way used to manually feed the object toward the gauge plate 1.

The meat carriage 4 is provided with a compression spring 18 mounted upon a rod 19 carried by the brackets 13 and 14 and enclosed in a barrel 20. Slidable on this barrel 20 and turnable with respect to rod 19 is a coupling device which includes a handle 21 having a cuff or shank 22 which is turnably but endwise immovably mounted upon a sleeve 23 internally engaging an end of spring 18. The shank 22 is provided with a fork 24 straddling a rod 25 carried by supports 13 and 14, Fig. 1.

The purpose of the fork 24 and the rod 25 is to limit the turning movement of the handle 21.

The handle 21 is provided with a latch or catch 26, adapted to engage and disengage the head 10, and the position of engagement of this catch and head is illustrated by dotted lines in Fig. 3, and in that position the spring 18 is in a state of compression tending to push the head and with it the meat pusher toward the gauge plate.

The handle 17 is turnable in a hinge element 27 so as to turn the meat pusher into any convenient position, and said handle carries in a cuplike portion 28 a spring which operates between a nut on the shank of said handle 17 and the cup portion 28, so as to exert friction between the cup portion 28 and a flange 29 on the handle with respect to the hinge element 27.

The mode of operation is substantially as follows:

With the handle 21 in the position shown in Fig. 2, the spring is distended and the head 10 is free to be slid manually toward the gauge plate 1 in order to feed the object to be sliced as the meat carriage is reciprocated back and forth on the ways 6. The meat pusher may engage by its teeth 16 the top of the object to be sliced for which purpose it is manually turned about its hinge 15' into the position generally indicated by dotted lines in Fig. 1. The pusher may be similarly turned about its hinge into the position indicated in Fig. 1 by full lines so as to operate on the end of the meat. With the meat pusher in operative relation to the object to be sliced, the handle 21 may be pulled toward the left in Fig. 3, compressing the spring 18, and then turned to bring its latch 26 into engagement with the head 10. By this operation the spring 18 is set and operatively connected with the meat pusher so that the latter is spring operated toward the gauge plate.

It will be obvious that various changes and modifications may be made in detail of construction without departing from the spirit of this invention, and I do not purpose limiting the patent granted thereon, except as necessitated by the prior art.

What I claim as my invention and desire to secure by Letters Patent is:

1. In a slicing machine, the combination of a gauge plate, a carriage, a head carried by said carriage and slidable with respect to the gauge plate, a meat pusher hinged to said head, a spring device carried by the carriage and effective toward the plate, and a coupling device for setting said spring device and for connecting and disconnecting the head and the spring device.

2. In a slicing machine, the combination of a carriage, a gauge plate, a meat pusher carried by the carriage and slidable with respect to the gauge plate, a spring device effective toward the plate, and a coupling device for setting the spring device and for connecting and disconnecting the meat pusher and spring device.

3. In a slicing machine, the combination of a gauge plate, a carriage having parallel guide rods, a head slidable on one set of said rods, a meat pusher connected to said head, compression spring mechanism mounted on one of said rods and including a turnable latch adapted to engage and disengage said head, and including also a fork cooperating with another of said rods.

4. In a slicing machine, the combination of a gauge plate, a carriage, a head carried by the carriage and slidable with respect to the plate, a meat pusher hinged and turnably mounted with respect to the head, and a friction device for opposing turning movement of the meat pusher.

5. In a slicing machine, the combination of a gauge plate, a reciprocating table, a slidable head, a meat pusher connected to said head, and spring mechanism including a latch adapted to engage and disengage said head.

6. In a slicing machine, in combination with a reciprocable carriage and a supporting member thereon over which material may be fed for slicing purposes, a feeding device so mounted with relation to the combination noted as to be manually movable relative thereto, and auxiliary resilient means for actuating said feeding device.

7. In a slicing machine, in combination with a reciprocable carriage and a supporting member thereon over which material may be fed for slicing purposes, a feeding device so mounted with relation to the combination noted as to be manually movable relative thereto, and auxiliary resilient means for actuating said feeding device, and means for inhibiting said auxiliary resilient means.

8. In a slicing machine, in combination with a reciprocable carriage having a material supporting member thereon, a feeding device movable relative to said supporting member, resilient means for actuating said feeding device, and means for inhibiting said resilient means.

9. A feeding device for use in association with a carriage in a slicing machine comprising resilient means for pressing said feeding device across the carriage and means for inhibiting the resilient means thereby releasing the feeding device for manual operation.

10. In a slicing machine, a carriage having guides extending across the same, a tray for supporting material to be sliced, means guided on said guides tending to constantly urge material being sliced along said tray, and means for releasing said means for manual operation.

11. In a slicing machine, in combination with a reciprocable carriage and a supporting member thereon over which material may be fed for slicing purposes, a feeding device so mounted with relation to the combination noted as to be manually movable relative thereto, and auxiliary resilient means for actuating said feeding device, including a coil spring and a coupling member, associated with said spring and adapted for actuating contact with the feeding device, said coupling member being movable selectively into inoperative and into operative position in relation to said feeding device.

12. In a slicing machine, in combination with a reciprocable carriage and a supporting member thereon over which material may be fed for slicing purposes, a feeding device so mounted with relation to the combination noted as to be manually movable relative thereto, and auxiliary resilient means for actuating said feeding device, including a coil spring and a coupling member, associated with said spring and adapted for actuating contact with the feeding device, said coupling member being rotatable selectively into inoperative and into operative position in relation to said feeding device, about an axis generally coincident with the longitudinal axis of the spring.

13. In a slicing machine, in combination with a reciprocable carriage and a supporting member thereon over which material may be fed for slicing purposes, a feeding device so mounted with relation to the combination noted as to be manually movable relative thereto, and auxiliary resilient means for actuating said feeding device, including a coil spring, a cylindrical tube about said spring and a coupling device intermediate said spring and feeding device.

14. In a slicing machine, in combination with a reciprocable carriage and a supporting member thereon over which material may be fed for slicing purposes, a feeding device so mounted with relation to the combination noted as to be manually movable relative thereto, and auxiliary resilient means for actuating said feeding device, including a coil spring, a cylindrical tube about said spring and a coupling device intermediate said spring and feeding device, and means for positioning said coupling device in inoperative position in relation to said feeding device.

In testimony whereof I have affixed my signature.

PATRICK J. LUCEY.